Figure 1:
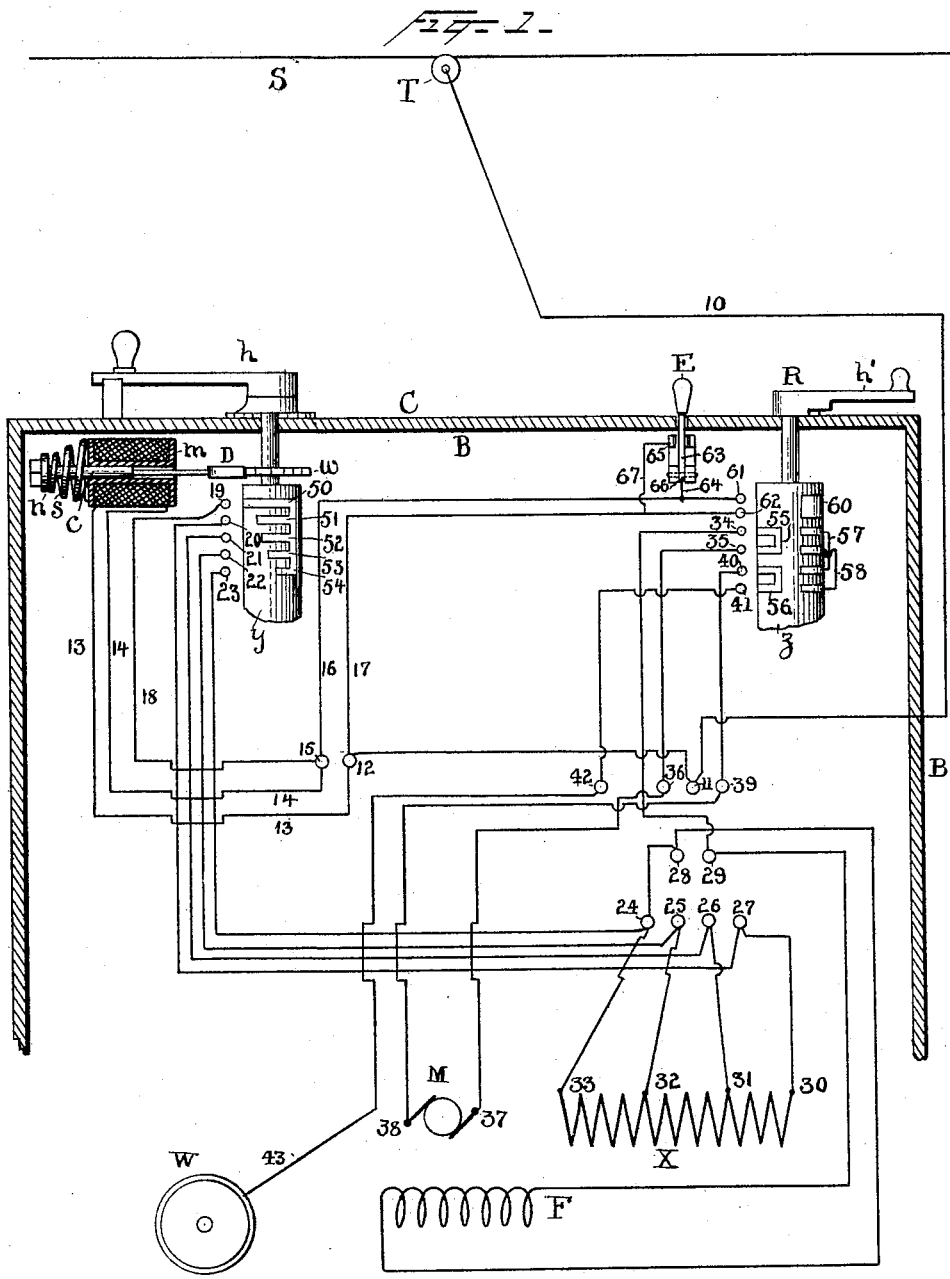

No. 612,203. Patented Oct. 11, 1898.
R. HUTCHISON.
CONTROLLING SWITCH FOR ELECTRIC MOTORS.
(Application filed Feb. 17, 1898.)

(No Model.) 4 Sheets—Sheet 1.

WITNESSES: INVENTOR
BY
ATTORNEY

No. 612,203. Patented Oct. 11, 1898.
R. HUTCHISON.
CONTROLLING SWITCH FOR ELECTRIC MOTORS.
(Application filed Feb. 17, 1898.)
(No Model.) 4 Sheets—Sheet 2.

No. 612,203. Patented Oct. 11, 1898.
R. HUTCHISON.
CONTROLLING SWITCH FOR ELECTRIC MOTORS.
(Application filed Feb. 17, 1898.)
(No Model.) 4 Sheets—Sheet 3.

No. 612,203. Patented Oct. 11, 1898.
R. HUTCHISON.
CONTROLLING SWITCH FOR ELECTRIC MOTORS.
(Application filed Feb. 17, 1898.)

(No Model.) 4 Sheets—Sheet 4.

WITNESSES: INVENTOR
Norris H. Clark. Reese Hutchison
Walter D. Place. BY
M. B. Vansize
ATTORNEY

THE NORRIS PETERS CO., PHOTO-LITHO., WASHINGTON, D. C.

UNITED STATES PATENT OFFICE.

REESE HUTCHISON, OF MOBILE, ALABAMA, ASSIGNOR OF THREE-FOURTHS TO JAMES H. WILSON AND JOSEPH A. MALONEY, OF SAME PLACE.

CONTROLLING-SWITCH FOR ELECTRIC MOTORS.

SPECIFICATION forming part of Letters Patent No. 612,203, dated October 11, 1898.

Application filed February 17, 1898. Serial No. 670,604. (No model.)

*To all whom it may concern:*

Be it known that I, REESE HUTCHISON, a citizen of the United States, and a resident of Mobile, in the county of Mobile and State of Alabama, have made certain new and useful Improvements in Controlling-Switches for Electric Motors, of which the following is a specification.

My invention is an improvement in controlling-switches for electric motors and is especially useful in electric propulsion of wheeled vehicles.

The object of my invention is to provide means for controlling the switch employed to vary the strength of current flowing in the motor-circuit and to prevent a careless, unskilled, or vicious operator from injuring the motor or motor-circuit by introducing excessive strengths of current or abruptly varying the current except at safe points or in cases of emergency or imminent danger.

It is well understood that when an electric motor generates no counter electromotive force it is customary to introduce into circuit artificial adjustable resistances and the connections of the motors with respect to each other and to the source of current are varied also, thus guarding against the flow of excessive current, as well as modifying the speed and power of the motors. For this purpose it is common practice to employ multiple-contact switches—that is, switches having a series of fixed contacts and one or more movable contacts—by which variations in the amount of resistance in the motor-circuit and the connections of the motors with respect to each other and to the supply-circuit are quickly and accurately made. These switches have a number of contact positions, and in successively moving from one position to another the effective strength of current in the car-circuit is varied in two ways—first, by the arrangement of the resistances and the connections of the motors, and, second, by the counter electromotive force due to variations in speed of the motor or motors. It is well known to be wasteful of energy and dangerous to the useful life of the apparatus to suddenly and abruptly move the controlling-switch from one contact-point to another in succession without permitting the necessary time to intervene to allow the effective strength of current to reach its normal or predetermined safe point.

My invention consists in the arrangement of a locking device so that the moving element of the controlling-switch is caught and held in each contact position successively. In connection with this locking device I employ an electromagnetic device, such as an electromagnet or a solenoid, adjusted to respond to a predetermined strength of current only, and this magnet will only free and release the locking device when such predetermined strength of current is present or not exceeded in the motor-circuit. By this means it is made impossible to change the multiple-contact switch from one contact position to another until the predetermined safe strength of current has been established, and thus economy and safety are guaranteed at all times.

To provide for emergencies, I provide two simple switches for cutting my controlling-magnet out of circuit. The first contact of each switch is connected to one terminal of the magnet. The second contact of each switch is connected to the opposite terminal of the said magnet, the arrangement being such that when either pair of contacts is closed the magnet is cut out of circuit. One of these switches forms part of or is operated by the usual motor-reversing switch. The other switch is independently located in operative proximity to the controller and normally held in an open position by a seal or severable section, as a section of soft metal wire, which can be broken by the motorman under proper conditions, but when broken will serve as a "telltale" device to indicate that the switch has been operated and an explanation will be called for.

The accompanying drawings illustrate my invention.

Figure 2:
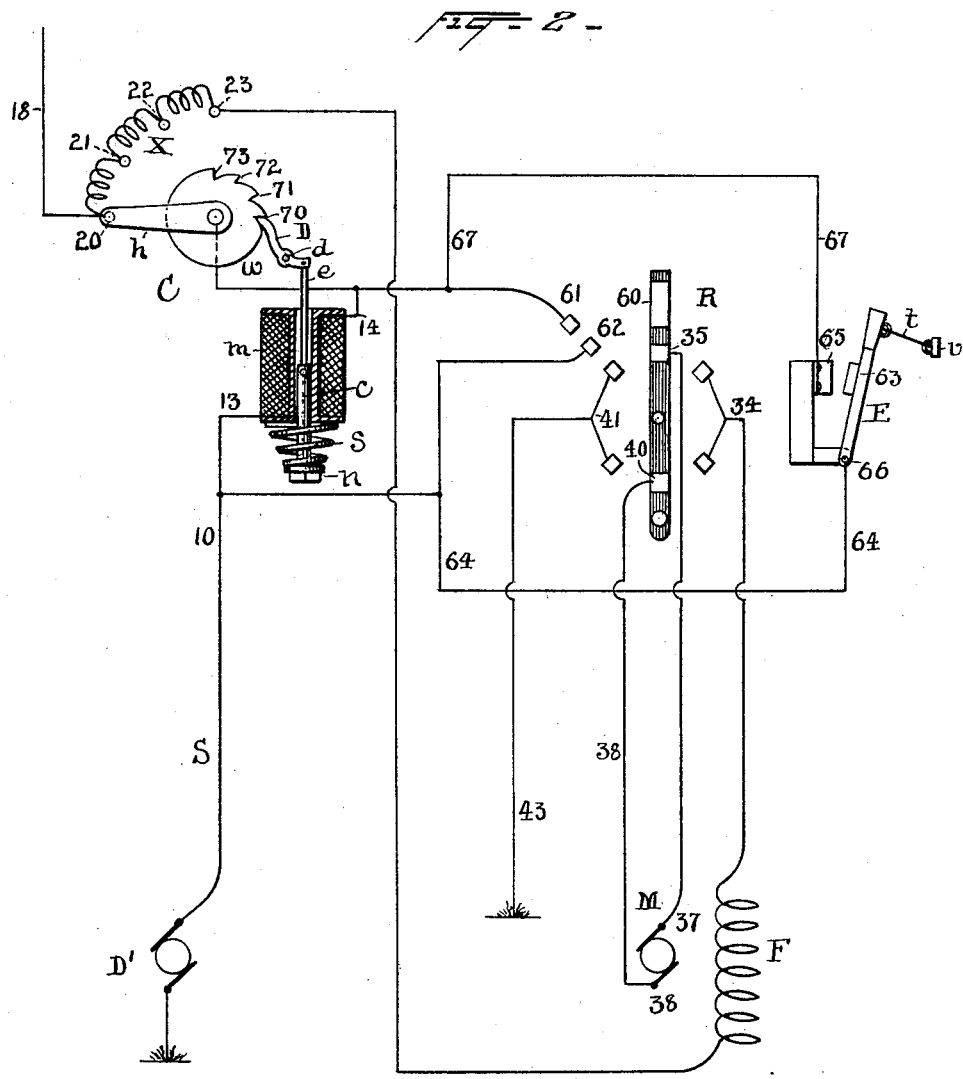
Figure 3:
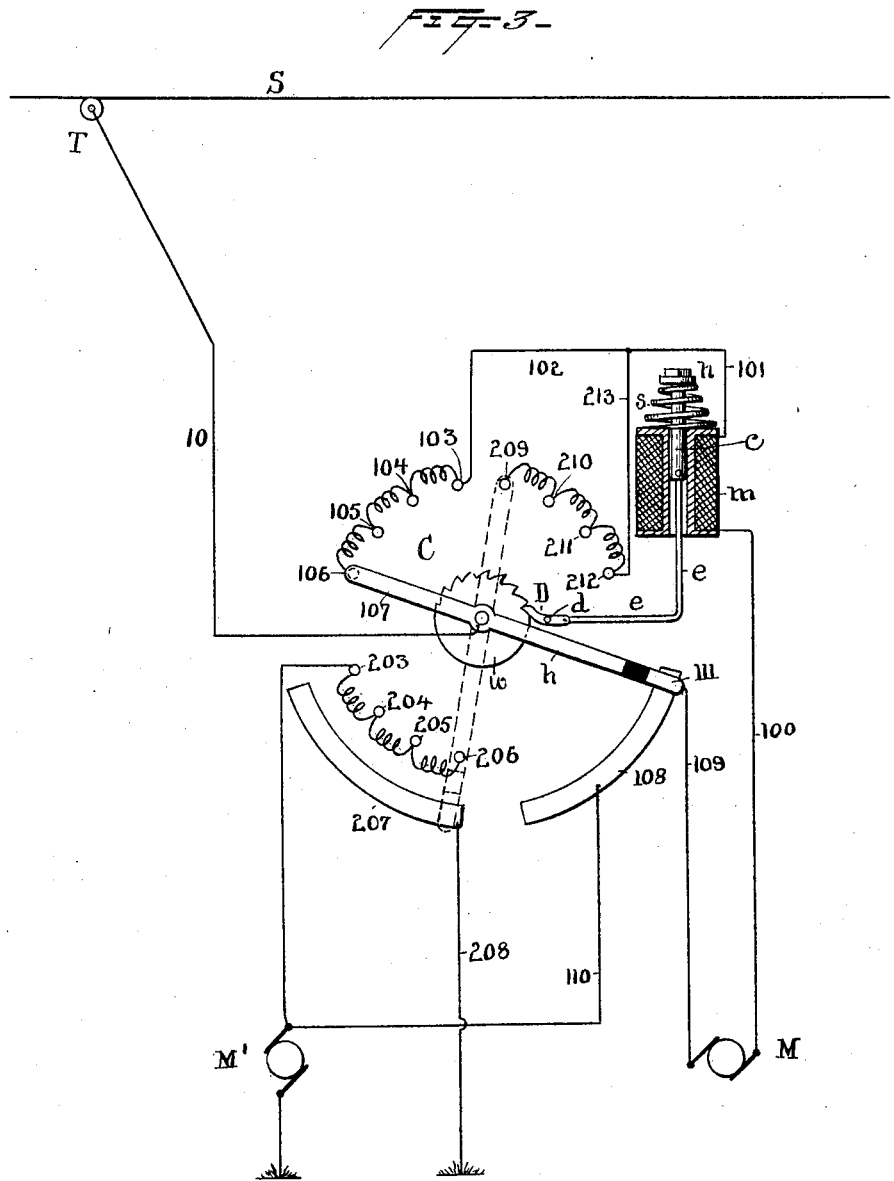
Figure 4:
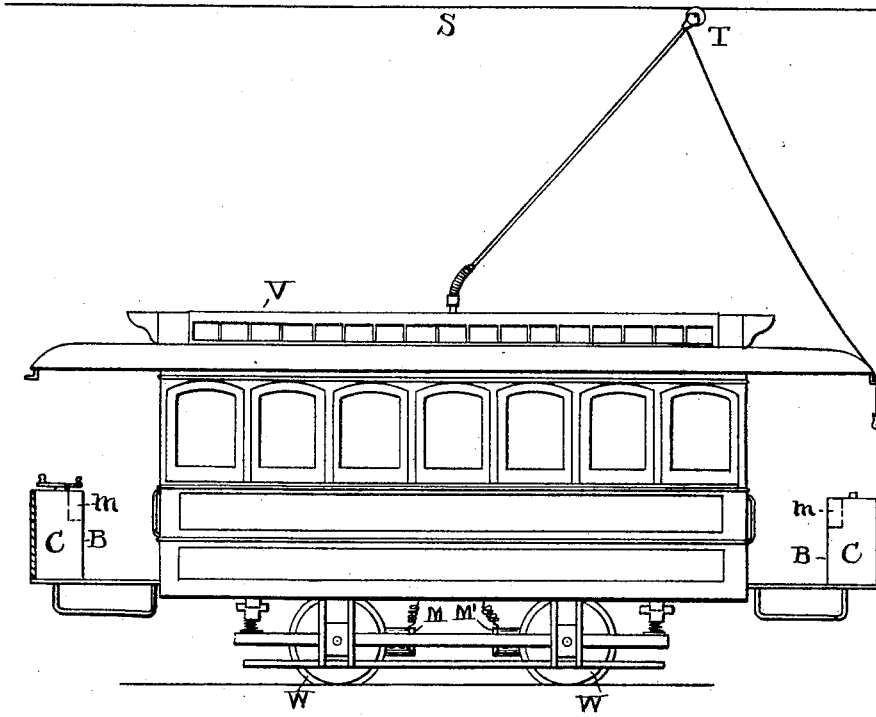

Figure 1 shows my improvement applied to the multiple-contact switch with reversing-switch constituting essential parts of the well-known car-controller. Fig. 2 is a diagram arranged to show the electrical connections with a single motor. Fig. 3 is a diagram arranged to illustrate the electrical connections of my improvement applied to the well-known series-multiple motor-controller in which two motors are employed; and Fig. 4 shows the application of my invention to a wheeled vehicle, such as a street-railway car.

Referring to Fig. 1, S is a supply-circuit. This may be either stationary, with an overhead or underneath conductor, or it may be a source of electricity carried on the vehicle. In the case of a stationary generator there is employed a traveling contact, like T.

C is a multiple-contact switch. R is a reversing-switch having its contact-points connected with the motor-coil terminals and with the terminals of the motor-circuit arranged to reverse the direction of current in the motor. The controller C has a rotary operating-handle $h$. The reversing-switch has an operating-handle $h'$. The switches C and R are usually placed under one inclosing case, like B, and there is one on each platform of a car. In the controller C there is a vertical cylinder $y$, carrying a series of electrical contacts of varying extent, like 50 to 54, and there is a series of fixed contacts registering with the movable contacts, like 19 to 23. There is also an artificial resistance X, divided into sections connected at their terminals 30 to 33 with screw-posts 24 to 27, the latter being electrically connected with the fixed contacts 19 to 23 of the controller, respectively. The reversing-switch R has a vertical rotary cylinder $z$ and a series of contacts variously grouped and positioned, as shown at 55 to 58, and there is a series of fixed contacts registering with the movable contacts, as shown at 34, 35, 40, and 41.

M is a motor. Its terminals 37 and 38 are connected with the binding-posts 36 and 39, the latter points being electrically connected to the fixed contacts 35 and 40.

F is the field-coil of the motor. Its terminals are connected to the binding-posts 28 and 29. The post 29 is connected to the fixed contact 34 of switch R, and the post 28 is connected through the resistance X with the binding-post 27 and point 20 in the controller C. The fixed contact 41 of the switch R is connected with binding-post 42 and by conductor 43 with the ground or return circuit at W.

By varying the radial position of the handle $h$ of the switch C the resistance X may be all included in circuit with the motor or one or more coils thereof may be included in circuit with the motor, as desired. In this way the strength of current coming from the supply-conductor S is varied in the motor-circuit. When current is first admitted, the motor is idle and offers no counter electromotive force. All the resistance X is included in circuit to diminish the strength of current, the motor starts into action, its counter electromotive force rises, the effective strength of current in the motor-circuit decreases, and additional resistance is then removed. Theoretically and to secure the best results the described decrease of resistance should be at a rate commensurate with the rise of the counter electromotive force; but a careless and inefficient motorman for selfish reasons or from ignorance will rapidly move the controlling-handle to withdraw artificial resistance faster than the compensating counter electromotive force can be developed. The result of this misuse approximates the result due to introducing the full strengh of current from the supply-circuit to the motor when no resistance and no counter electromotive force are present. My invention renders this action impossible. The mechanism I prefer to employ is arranged as follows: On the shaft of the cylinder $y$ I fix a toothed wheel $w$. (Shown in each figure of the drawings.) The number of teeth in this wheel is at least equal to the number of contact positions of the handle $h$. As shown in Fig. 2, there are four contact positions 20, 21, 22, and 23. The wheel $w$ has four teeth 70, 71, 72, and 73. D is a dog pivoted at $d$. Its free end engages the teeth of the wheel $w$.

$m$ is an electromagnetic device, preferably in the form of a solenoid, located in a vertical position. $m$ has a core $c$ under control of a helical conical spring $s$, the retractile force of which is adjustable by means of a screw and nut, like $n$. One end of the dog D is mechanically connected with the core $c$. The reciprocation of the core $c$ causes the free end of the dog D to engage and disengage with the teeth of the wheel $w$.

In a single motor equipment the magnet $m$ is included in the motor-circuit at a point between the multiple-contact switch C and the source of supply D', current passing from the supply-conductor S via T, 10, 11, 12, 13, $m$, 14, 15, 18, 19, 50, 51, 20, 27, X, 24, 28, F, 29, 34, 55, 35, 36, 37, 38, 39, 40, 56, 41, 42, and 43 to W, and return. The course of this circuit is shown in Fig. 2 with some of the unessential parts omitted for clearness and brevity. When the handle $h$ is in this last-described position, the car is assumed to be starting and no counter electromotive force apparent. The strength of current is assumed to be such that the core $c$ is attracted, overcoming the force of the spring $s$. The wheel $w$ is locked by the dog D. As the counter electromotive force rises the effective strength of current drops, magnet $m$ releases the wheel $w$, and the handle $h$ can be moved to the second notch or position, (shown at 21.) This establishes new conditions in the motor-circuit, because more current can flow from the supply-circuit. The magnet $m$ responds and again locks the wheel $w$; but as the counter electromotive force rises by the increased speed of the motor due to the increased current from the supply-circuit a counter electromotive force is almost immediately generated which causes the predetermined effective strength of currrent to be again established in the motor-circuit. When this occurs, the magnet $m$ releases the wheel $w$, the handle $h$ is unlocked, and the motorman can proceed to move it to a third position. This same operation is repeated for each contact position of the handle $h$ and for each corresponding locking position of the dog D and wheel $w$, the effect of this automatic control being to obviate the possibility of changing from one contact position to another at any interval when the effective strength of current in the motor-circuit exceeds a predetermined maximum, which is determined by the adjustment of the retractile spring $s$ for any particular case or condition.

It is necessary to provide for emergencies, such as that when the motor is upon a car under headway and an accident is about to happen, to avoid which the motorman would naturally reverse the motor. The locking device would not allow him to move the controlling-handle unless the conditions were of the predetermined character. To provide for such occasions, I connect a simple switch mechanically to the reversing-switch or so arrange this switch that the reversal of the handle $h'$ will deprive the magnet $m$ of its control during the time that the handle $h'$ is in reverse position. For this purpose I place upon the cylinder $z$ of the reversing-switch a movable contact 60, and I add two fixed contacts 61 and 62. The contact 61 is connected by the wire 16 with one terminal of the solenoid $m$. The contact 62 is connected by the wire 17 with the opposite terminal of the solenoid-magnet $m$. As shown in Fig. 1, the handle $h'$ is in position to propel the motors forward. Upon shifting $h'$ so that the contact 60 engages with the contacts 61 and 62 a short circuit is formed around the solenoid-magnet $m$, which is temporarily put out of use.

There is another emergency of not infrequent occurrence when the unlimited use of current is permissible under satisfactory explainable circumstances, and this often occurs at a time when the reversing-switch is not called into operation. The occasion referred to would be presented where a car is crossing an intersecting street and a fire-engine or other vehicle practically out of control is approaching. The car must be spurted ahead to avoid collision. Another occasion would be where the car has been derailed at one end and it was desirable to pull it back on the track by its own motive power regardless of the expense in power or material involved. For this purpose I provide a simple circuit-breaking switch E. (Shown in Figs. 1 and 2.) There is a movable reciprocating contact 63 upon a lever pivoted at 66, and there is a fixed contact at 65. These contacts are preferably of a knife-edge and spring-jaw pattern. The movable contact 63 is electrically connected by the wire 64 with one terminal of the magnet $m$, and the fixed contact 65 is similarly connected by the wire 67 with the opposite terminal of the magnet $m$, these connections being practically identical with those described for the contacts 61 and 62 in the reversing-switch R. The movable contact 63 is normally held against a back-stop by means of a severable seal or telltale device $t$. This preferably consists of a short section of soft metal wire suitably identified, one end of which is connected with the movable part of the switch E, while the opposite end is connected with a fixed point $v$. When the abnormal conditions described are presented and it is desired to relieve the multiple-contact switch from the control exercised by the electromagnetic device $m$, sufficient manual force applied to the handle of the switch E will break the seal and bring the contacts 63 and 65 together. The magnet $m$ is thus short-circuited and the multiple-contact switch can be used without restraint.

In Fig. 3 I have diagrammatically illustrated a suitable connection for the electromagnetic device $m$ in cases where two motors are employed in connection with a switch, which permits of introducing and withdrawing resistance, as well as connecting the motors in series and in parallel circuit. Where the motors are placed in parallel circuit, the effective strength of current at some time equals at least twice the strength of current taken by one motor or by both motors in series, and the controlling-magnet $m$ must be placed in position where the predetermined strength of current permissible for one motor will control its operation.

M and M' are the two motors referred to. The controller C represented operates substantially like that heretofore described, and the locking device, with the controlling-magnet $m$, is arranged similar to that heretofore described. The diagram shows in full line the artificial resistance and the two motors in series with the magnet. Current passes from the supply-circuit via the conductor 10 to the handle $h$, thence via 107, through the resistance 106 to 103, 102, 101, $m$, 100, M, 109, insulated contact-point 111 on the arm $h$, fixed contact 108 110, and motor M', to the return-circuit. With the handle $h$ shifted to the dotted-line position current will pass via conductor 10, handle $h$, where it divides, passing thence via 107, 209, 212, 213, 101, $m$, 100, M, 109, 111, 207, and 208 to the return-conductor, the second branch being via $h$, 206, 203 to M' and return-conductor. This places the motors in parallel circuit, with more or less resistance in each branch, according to the position of the handle $h$; but the magnet $m$ is always in series with one motor, and when the motors are in parallel circuit the magnet $m$ is in series with one motor and in parallel circuit with the other, so that assuming sixty amperes passing to the two motors, each motor taking one-half thereof and thirty amperes being the predetermined strength of current which it is permissible to establish for one motor, the magnet $m$ may be adjusted to respond to this predetermined strength of current only, and the motors, either or both, will always be protected from abnormal changes and abnormal strengths of current.

In Fig. 4 I have shown the application of my invention to a wheeled vehicle V. The controller C, placed in a case B, with the controlling-magnet $m$, are located one upon each platform, and the motors M and M' are each mechanically connected with a wheel W or axle to propel the car.

While I have shown my invention in connection with a stationary generator and a supply-circuit with a traveling contact, I wish to state that my invention is applicable to any form of moving vehicle and any known arrangement of the supply-circuit and source of electricity.

What I claim, and desire to secure by Letters Patent, is—

1. The combination of a supply-circuit and two or more electric motors in separate branch circuits, a multiple-contact switch and electrical connections between points in said switch and the terminals of said motor branches whereby said branches may be connected in series or in parallel arrangement, a locking device for said switch, and an electromagnet to control said locking device having its coils included in one of said motor branches, substantially as described.

2. The combination with a suitable source of electricity and an electrically-propelled vehicle of two electromagnetic motors each motor mechanically connected to a wheel or axle of the vehicle, a car-circuit containing an adjustable artificial resistance, two branch circuits each containing the coils of a motor, a rotating switch having a series of contacts respectively connected to points in the artificial resistance and the terminals of the motor branches, a locking device for said switch and an electromagnet to control said locking device having its coils in a motor branch circuit responsive to a predetermined strength of current, substantially as described.

3. The combination of two electromagnetic motors, a common source of electric energy therefor, and means for simultaneously varying the power and speed of said motors consisting of an adjustable artificial resistance in a branch circuit common to both motors, a separate branch circuit for each motor, a rotating switch having a series of contacts connected to points in said resistance and to the terminals of the motor branch circuits, a locking device for said switch and an electromagnet responsive to a predetermined strength of current to control said locking device having its coils included in one of the motor branch circuits, substantially as described.

4. The combination with a suitable source of electricity and an electrically-propelled vehicle of two electromagnetic motors mechanically connected to the wheels or axles thereof, respectively, means for connecting said motors in parallel and in series relation to vary the effective strength of current with respect to both motors simultaneously, said means consisting of a rotating switch having a series of fixed and movable contacts connected respectively to the terminals of the field and armature coils of said motors, a locking device for said switch having a series of engaging points in number equal to the contact-points of said switch, and an electromagnet to control said device having its coils in a motor branch circuit responsive to the predetermined maximum current permissible in said motor branch, substantially as described.

5. The combination of two electric motors, a motor-circuit therefor, a multiple-contact switch for connecting said motors in series and in parallel branch circuit with respect to each other, a locking device for said switch, and an electromagnet responsive to a predetermined strength of current having its coil located in said circuit in series with one motor and in parallel with the other motor, substantially as described.

6. The combination of an electric motor, a motor-circuit therefor, means for varying the effective strength of current in said circuit including a multiple-contact switch, a locking device for holding said switch in any contact position, an electromagnet included in the motor-circuit responsive to a predetermined strength of current only to control said switch and a separate switch located in close proximity to the first-named switch having its contact-points connected to opposite terminals of said magnet whereby said magnet may be included and excluded with respect to the motor-circuit, substantially as described.

7. The combination of an electric motor, a motor-circuit therefor, means for varying the effective strength of current in said motor-circuit including a multiple-contact switch, a locking device for holding said switch against movement, a magnet in circuit with said motor to control said locking device, a separate circuit-breaking switch located in proximity to the first-named switch, electrical connections between the contact-points of said switch and points in the circuit of said magnet and a seal or severable mechanical connection for said switch, substantially as described.

8. The combination of an electric motor, a motor-circuit therefor, means for varying the effective strength of current in said motor-circuit including a multiple-contact switch, a controlling device for said switch having a locking-point for each contact position of said switch, an electromagnet in the motor-circuit responding to a predetermined strength of current to lock said switch at any point, and an emergency-switch in close proximity to the first-named switch having its contact-points connected to opposite terminals of said magnet, substantially as described.

9. The combination of an electric motor, a motor-circuit therefor, means for varying the effective strength of current in said motor-circuit including a multiple-contact switch, a locking device for said switch, a magnet for controlling said locking device, a separate switch located adjacent to the first-named switch connected to the circuit of said magnet and a seal or suitable mechanical connection retaining said switch in a normal position until severed, substantially as described.

10. The combination of an electric motor, a motor-circuit therefor, means for varying the effective strength of current in said circuit including a multiple-contact switch, a locking device for holding said switch against movement, a magnet in circuit with said motor to control said locking device, a reversing-switch for changing the direction of the current in the coils of said motor and contact-points mechanically connected with said reversing-switch and electrically connected with said magnet arranged to include and exclude said magnet with respect to the motor-circuit, substantially as described.

11. The combination of an electric motor, a motor-circuit therefor, means for varying the effective strength of current in said circuit including a multiple-contact switch, a locking device for holding said switch against movement, an electromagnetic device in circuit with said motor to control said locking device, a reversing-switch connected to said circuit and to the coils of said motor, contact-points operated by said reversing-switch and electrically connected with the branch circuit containing the electromagnetic device and an emergency-switch having its contact-points electrically connected with the last-named branch, substantially as described.

12. The combination of an electric motor, a motor-circuit therefor, means for varying the effective strength of current in said circuit including a multiple-contact switch, a locking device for holding said switch against movement, an electromagnetic device in circuit with said motor to control said locking device, a reversing-switch connected to said circuit and to the coils of said motor, contact-points operated by said reversing-switch and electrically connected with the branch circuit containing the electromagnetic device, an emergency-switch having its contact-points electrically connected with the last-named branch, and a seal or severable mechanical connection for retaining said switch in a normal position, substantially as described.

13. The combination in an electric railway of a car, two electric motors therefor, each motor being mechanically connected with a wheel or axle thereof, a supply-circuit, a car-circuit having branches for each motor, a switch for connecting said motors in series and in parallel with respect to each other whereby the strength of current in said car-circuit is varied, the locking device for said switch, an electromagnetic device for controlling said locking device and connections for said electromagnetic device whereby it is subjected to the strength of current flowing in a motor branch only, substantially as described.

14. The combination in an electric railway of a car, two electric motors therefor, each motor being mechanically connected with a wheel or axle thereof, a supply-circuit, a motor-circuit having branches for each motor, means for varying the effective strength of current in the motor-circuit including a multiple-contact switch, a locking device for said switch and an electromagnetic device for controlling said locking device having its coils included in a branch circuit in series with one motor and in parallel with the other motor, substantially as described.

15. The combination in an electric railway of a car, two electric motors therefor, each motor being mechanically connected with a wheel or axle thereof, a supply-circuit, a motor-circuit having branches for each motor, means for varying the effective strength of current in the motor-circuit including a multiple-contact switch, a locking device for said switch, an electromagnetic device controlling the locking device having its coils in the motor-circuit, a reversing-switch having contact-points connected to the motor-coils and the motor-circuit respectively and a switch operated by said reversing-switch having its contact-points connected to points in the branch circuit containing the controlling-magnet, substantially as described.

16. The combination in an electric railway of a car, two electric motors therefor, each motor being mechanically connected with a wheel or axle thereof, a supply-circuit, a motor-circuit having branches for each motor, means for varying the effective strength of current in the motor-circuit including a multiple-contact switch, a locking device for said switch, an electromagnetic device controlling the locking device having its coils in the motor-circuit, and a switch located in proximity to the multiple-contact switch having its contact-points electrically connected to points in the branch circuit containing the electromagnetic device, substantially as described.

17. The combination in an electric railway of a car, two electric motors therefor, each motor being mechanically connected with a wheel or axle thereof, a supply-circuit, a motor-circuit having branches for each motor, means for varying the effective strength of current in the motor-circuit including a multiple-contact switch, a locking device for said switch, an electromagnetic device controlling the locking device the coils thereof being included in the motor-circuit, a reversing-switch having its contact-points respectively connected to points in the motor-circuit and to motor-coil terminals and two simple circuit-breaking switches located in proximity to the multiple-contact switch, one contact of each of said switches being connected to one terminal of said electromagnet, the second contact of each of said switches being connected to the opposite terminal of the magnet, a mechanical connection between one of said switches and the reversing-switch and a seal or severable connection for the second said switch retaining its movable contact in a normal position, substantially as described.

REESE HUTCHISON.

Witnesses:
 WALTER S. PLACER,
 CAROLINE E. DAVIDSON.